United States Patent Office 2,922,748
Patented Jan. 26, 1960

2,922,748

AUTOLYSIS PROCESS AND PRODUCT

Henry J. Peppler, Whitefish Bay, and John A. Thorn, Brookfield, Wis., assignors to Red Star Yeast and Products Company, Milwaukee, Wis., a corporation of Wisconsin No Drawing. Application May 15, 1956
Serial No. 584,893

8 Claims. (Cl. 195—62)

This invention relates to a process of increasing the invertase concentration in solid substances normally containing invertase and has for an object the provision of a process for increasing the invertase concentration in microbial cellular material.

It is well known that the cells of many microorganisms incuding molds and yeasts contain substantial quantities of invertase which latter is elaborated during the growth of the microorganisms in suitable culture media. The enzyme invertase is useful in many industries as an enzymatic catalyst for converting sucrose to invert sugar. As a matter of fact, it has been the practice in certain of the sugar cane growing countries to treat a sugar cane molasses with invertase in order to invert the sucrose, thereby producing a product from which a high test molasses can be formed. In these procedures the invertase is usually added to the molasses in the form of a dried yeast preparation and the amount of yeast employed depends upon its invertase content.

Accordingly, it is a further object of this invention to provide a process for producing a yeast product having an enhanced invertase content.

Further and additional objects will appear from the following description and the appended claims.

In accordance with this invention it has been discovered that if a mass of microbal cells, such as yeast, normally containing invertase is autolyzed in the presence of chloroform, a substantial portion of the solid content of the cells passes into solution. However, it has been found that the invertase is not substantially solubilized during this autolysis in the presence of chloroform and, accordingly, the residual cellular material after the autolysis will retain substantially all of its invertase content. By virtue of this principle it has been discovered that a substantial proportion of the solids content of yeast can be extracted by a procedure which involves autolysis in the presence of chloroform and the resulting solids which may then be dried have a higher invertase content than the cellular material originally treated.

For a more complete understanding of this invention, reference will be made to a specific example which illustrates one method of carrying out this invention.

Fifty parts by weight of bakers' yeast compressed cake were crumbled and mixed with about 7.5 parts by weight (5 parts by volume) of chloroform and 50 parts by weight of water. After thorough mixing, the mixture containing about 16% by weight of yeast solids was incubated for a period of about six hours at 30° C. to permit autolysis. Thereafter the product was filtered to separate the soluble material and the cellular solids were then subjected to a normal drying procedure such as is used in the preparation of active dry yeast to produce a dry product having about 8% moisture. The initial yeast treated by this procedure had an invertase concentration of about 2000 inverton units per gram (dry basis) and the final dried product had an invertase concentration of about 2600 inverton units per gram. One inverton unit is defined as the quantity of invertase which will invert 5 milligrams of sucrose per minute at zero time 25° C. as outlined in the method of Johnston, Redfern and Miller, Ind. Eng. Chem., Anal. Ed., 7, 82 (1935). Thus it can be seen that a dry solid yeast product was prepared by the process of this example in which the invertase concentration has been substantially increased over that normally present in the yeast.

In the foregoing example specific reference has been made to the use of a bakers' yeast. It will be apparent that any other yeasts of the Saccharomyces genus may be employed. It is particularly useful to employ those yeasts which have been propagated in accordance with the disclosure in Shultz United States Patent No. 2,079,634, dated May 11, 1937. This invention also has applicability in the treatment of other invertase-containing microbial cellular material including the so-called torula yeasts, such as *Candida (Torulopsis) utilis*.

Chloroform is the autolytic agent which must be used in accordance with the process of this invention. All other autolytic agents tested, including toluene, carbon tetrachloride, 1,4-dioxane, diethylene glycol, ethyl acetate, iodoform, cetyl trimethyl ammonium bromide and sodium p-toluene sulfonate are unsatisfactory because they extract the invertase from the cellular material or because they fail to extract any substantial amount of total solids during autolysis. Thus it is preferred that chloroform be the only autolytic agent added to the material treated in accordance with this invention. The amount of chloroform employed as the autolytic agent may fall within the range of 0.25 to 5.0% by volume (0.375 to 7.5% by weight) of the aqueous yeast suspension treated. The preferred range is between ½ and 2% by volume (0.75 to 3.0% by weight). The concentration of yeast cells (dry weight basis) in the mixture subjected to autolysis is not particularly critical except that the mixture should be sufficiently fluid to permit easy mixing and uniform autolysis throughout. Thus the yeast concentration may suitably be between 5% and 25% by weight (dry basis) in the mixture subjected to autolysis.

The temperature for autolysis may vary within a wide range such as between 10° and 55° C. It is preferred, however, that autolysis be effected at a temperature between 20° and 45° C., the optimum being 25° to 35° C. The time employed for the autolytic treatment may vary widely and will depend upon the temperature employed, the cellular material treated, and, in part, upon the concentration of the chloroform used as the autolytic agent. Generally speaking, it is preferred that the autolysis be carried out for a period of ½ to 10 hours, shorter times being preferred at the higher temperatures. While times in excess of 10 hours may be employed under certain conditions, the solid invertase-containing residue remaining after such a long time process, particularly at the higher temperatures, may be difficult to separate from the liquids by filtration or other methods.

It will thus be apparent that a procedure has been provided for producing a solid material which has an invertase content higher than that of the cellular material from which it was originally prepared. The product may be subjected to the usual drying operations at temperatures which will not destroy or inactivate the invertase. The product has usefulness in the molasses industry for the inversion of sucrose to produce high test molasses. By use of the process of this invention the invertase concentration of yeast solids may be readily increased by 20% to 50% or more.

In the past, yeast cell solids, even when the yeast was cultivated by special techniques, did not have an invertase content in excess of 1800 or 2000 invertons per gram (dry basis). However, by the procedure described herein it is possible to produce a new product which on a dry weight basis contains invertase in a concentration in excess of 2200 invertons per gram and usually in excess of 2400 invertons per gram. Thus a further object of this invention is the provision of a solid yeast residue product having a high invertase content.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of increasing the concentration of invertase in yeast cellular material which comprises contacting a mass of invertase-containing yeast cells with from 0.375 to 7.5 percent by weight of chloroform in an aqueous suspension wherein the concentration of yeast cells in the mixture is between about 5 percent and 25 percent on a dry weight basis, maintaining a temperature of from about 10 to about 55° C., for a period of time sufficient to increase the invertase content of said yeast cells by at least about 20% on a dry weight basis, separating the resulting substantially invertase-free solution containing water, chloroform, and solubilized yeast solids from the residual solid invertase-containing cellular material and drying said residue of invertase-containing cells.

2. The process of claim 1 wherein the contacting is carried out at a temperature of from about 20° to about 45° C.

3. The process of claim 1 wherein the contacting step is carried out over a period of from one-half to ten hours.

4. The process of claim 1 wherein the yeast is of the genus Saccharomyces.

5. A process of increasing the concentration of invertase in yeast cellular material which comprises contacting a mass of invertase-containing yeast cells with from 0.375 to 7.5% by weight of chloroform in an aqueous suspension at a temperature of from about 10 to about 55° C., and for a period of time sufficient to increase the invertase content in said yeast cells by at least about 20% on a dry weight basis, thereafter separating the substantially invertase-free solution containing water, chloroform and solubilized yeast solids from the residual solid invertase-containing cellular material, and drying said residue of invertase-containing yeast cells.

6. The process of claim 5 wherein the contacting step is carried out over a period of from one-half to about ten hours.

7. The process of claim 5 wherein the yeast is of the genus Saccharomyces.

8. The process of claim 5, wherein the contacting is carried out at a temperature of from about 20° to about 45° C.

References Cited in the file of this patent

Chemical Abstracts, vol. 19 (1925), page 3095.

Invertase by Neuberg et al., Scientific Report Series No. 4, Sugar Research Foundation, Inc., New York (September 1946) (pp. 21 and 27 relied on).

Food Science Abstracts, vol. 28, No. 1, February 1956, pp. 4 to 6.